Patented Feb. 17, 1953

2,628,969

UNITED STATES PATENT OFFICE 2,628,969

IRON CATALYST FOR THE HYDROGENATION OF CARBON MONOXIDE

Walter Rottig, Oberhausen-Sterkrade-Nord, Germany, assignor to Ruhrchemie Aktiengesellschaft, Oberhausen-Holten, Germany, a joint-stock company of Germany No Drawing. Application September 30, 1949, Serial No. 118,993. In Germany October 1, 1948

5 Claims. (Cl. 260—449.6)

This invention relates to catalysts and more especially to iron catalysts adapted for use in the hydrogenation of carbon monoxide.

It is also concerned with the process of hydrogenation in the presence of the new catalysts.

It is an object of this invention to provide a catalyst which is particularly efficient in inducing the formation of oxygen compounds in the hydrogenation of carbon monoxide.

It is another object of this invention to provide a process for operating the hydrogenation of carbon monoxide under conditions which lead to the production of compounds, a high percentage of which are valuable oxygen compounds.

As is well known to those skilled in the art, iron catalysts obtained when precipitating iron salts such as nitrates with alkali compounds, are used in the hydrogenation of the carbon monoxide which forms a constituent of water gas and similar gas mixtures. It is equally known that these iron catalysts will retain their catalytic activity during much longer periods of time, if washed with particular care after precipitation, the washing step being required in order to remove as completely as possible practically all residual alkali compounds such as carbonate of soda which were used for precipitation, or such alkali compounds, for instance sodium nitrate, as may be formed by mutual reaction with iron salts. If a greater percentage of these alkali compounds, or even of only one of them, remains in the catalyst, i.e. if the catalyst was incompletely washed, not only its capacity of undergoing reduction is impaired, but it will also act in an unsatisfactory manner during the subsequent synthetical process. The life of such incompletely washed iron catalysts is materially shorter than the life of thoroughly washed catalysts.

I have now found to my surprise that incompletely washed iron catalysts, which still contain from 3 to 20 percent, and preferably from 5 to 10 percent alkali, calculated as $K_2O$, of the entire content of iron (Fe), are capable of inducing the formation of large quantities of products containing oxygen, for instance of alcohols, esters and aldehydes. In contrast thereto, iron catalysts which were practically freed from their alkali content only induce the formation of a comparatively low percentage of compounds containing oxygen.

In the production of the iron catalysts according to this invention, the catalytically active mass produced by precipitation of an iron salt with an alkali compound is washed only to a point, where the resulting catalyst still contains alkali compounds within the limit of 3 to 20 percent, calculated for $K_2O$, of the iron present, calculated as metallic iron. I prefer to so control the washing-out procedure that the catalyst, when ready for use, contains from 5 to 10 percent alkali, calculated as $K_2O$, of the iron present.

In respect of certain types of iron catalysts, I have found it advisable to follow up the partial washing-out of the alkali compounds with an impregnation of the catalyst with additional quantities of an alkali compound, which may be a hydroxide, carbonate or other salt of an alkali metal (Na, K, Li).

It is important to note that iron catalysts completely freed from the alkali compounds used in their precipitation cannot be rendered similarly effective for the synthetical process by a subsequent impregnation with alkali compounds, as are the catalysts obtained according to this invention, i. e. by an incomplete washing-out of the residual alkali.

The iron catalysts produced according to this invention offer the following advantages: they induce the synthetical formation of a high percentage of compounds containing oxygen at comparatively low temperatures. In spite of their comparatively high alkali content, the products of the synthetical process will be predominantly low molecular compounds, and a surprisingly high percentage of oxygen-containing products will be formed. The very circumstantial washing-out of the metal hydroxides formed by precipitation is greatly simplified and lessened. While the washing-out, as hitherto practiced, of the precipitated catalyst requires from 2000 to 3000 liters water for a catalyst mass containing 8 kg. Fe, a mere 100 to 200 liters water will be sufficient for washing out the same amount of catalyst prepared according to our invention.

When using the new catalysts in the hydrogenation of carbon monoxide, the reaction is preferably carried through under a pressure of about 10 atmospheres above normal. It should be noted however, that with the new catalyst large quantities of products containing oxygen can already be obtained at normal atmospheric pressure. I have found that the highest yield of such compounds is obtained when operating under a pressure above 20 atmospheres.

Due to the high percentage of alkali compounds in the iron catalyst, the ratio of actually converted carbon monoxide in the gas mixture, for instance water gas, to the hydrogen consumed is unsatisfactory. I have found that in order to avoid this drawback, it is preferable to use as starting material a gas mixture rich in carbon monoxide. This will not only raise the yield per cubic meter of the starting gas mixture, but will also lead to an increase in the formation of oxygen-containing compounds.

The catalysts produced and used according to this invention may contain, besides the conventional activators such as copper, zinc or calcium, also other elements favoring the formation of oxygen-containing products. Such elements will be for instance vanadium, cerium and tungsten. Other elements or compounds of metals of the 4th to 7th groups of the periodic system may be present also.

In the production of an iron catalyst according to this invention and in its use for the production of oxygen-containing compounds when hydrogenating carbon monoxide, I have proceeded for instance as follows:

*Example*

A catalyst was prepared by pouring a boiling solution of the nitrates of iron and copper which contained calcium oxide and kieselguhr into a boiling soda solution, partially washing-out the precipitate and drying and reducing same at 300° C. The catalyst thus produced contained 100 parts by weight Fe, 5 parts Cu, 10 parts CaO, 10 parts kieselguhr and alkali in the amount of 8 parts, calculated for $K_2O$. Over this catalyst 100 liters water gas per 1 liter of the catalyst were passed hourly under a pressure of 10 atmospheres, the temperature being held at 220° C. The entire product obtained in this reaction contained from 30 to 40 percent of oxygen compounds, mostly alcohols.

When a catalyst of a similar composition, as far as iron, copper and calcium are concerned, but which was completely freed from residual alkali compounds by washing, was used in the same process, the percentage of alcohol amongst the products formed dropped to about 3 to 5 percent.

If this completely washed catalyst was enriched with alkali by subsequent impregnation with carbonate of potassium to contain about 8 percent alkali, calculated for $K_2O$, the yield of the synthetical process in oxygen-containing compounds rose to about 10 to 15 percent, i. e. to a fraction of the percentage of oxygen-containing compounds obtainable with the aid of an incompletely washed-out catalyst.

Various changes may be made in the starting materials and re-agents and in the character and succession of steps used in the preparation of the new catalyst as well as in the performance of synthetical processes using such catalyst, without departing from the invention or sacrificing the advantages thereof.

I claim:

1. The process of treating gas mixtures containing carbon monoxide and hydrogen to produce at least 30% of oxygen-containing products which comprises reacting such gas mixtures at a temperature of approximately 200° C. in the presence of a hydrogenation catalyst comprising a mixed, reduced, iron oxide-alkali metal salt precipitation product containing from 5 to 10% of alkali metal salt calculated as $K_2O$ of the iron present, calculated as Fe, the alkali metal salt being in situ formed during precipitation of the iron in said catalyst.

2. The process of claim 1 in which the hydrogenation is effected under a pressure ranging between 3 and 20 atmospheres.

3. The process of claim 1 wherein a catalyst is used which contains additional added alkali metal compounds.

4. The process of claim 1 wherein the catalyst contains 100 parts by weight of Fe, 5 parts by weight of Cu, 10 parts by weight of CaO, 10 parts of kieselguhr and 8 parts by weight of an alkali metal salt formed during the precipitation of the iron and copper by a soda solution from a solution of iron and copper nitrates, the alkali metal salt content being calculated as $K_2O$.

5. The process of claim 1 in which the content of carbon monoxide in the reaction mixture exceeds the hydrogen content and the reaction is carried through under a pressure ranging between 3 and 20 atmospheres.

WALTER ROTTIG.

REFERENCES CITED

The following references are of record in the file of this patent:

UNITED STATES PATENTS

| Number | Name | Date |
|---|---|---|
| 1,801,382 | Wietzel | Apr. 21, 1931 |
| 2,183,145 | Michael et al. | Dec. 12, 1939 |
| 2,254,806 | Michael | Sept. 2, 1941 |
| 2,257,457 | Fischer et al. | Sept. 30, 1941 |
| 2,264,427 | Asbury | Dec. 2, 1941 |
| 2,414,585 | Eggersten | Jan. 21, 1947 |
| 2,461,147 | Davies | Feb. 8, 1949 |